United States Patent Office 3,272,816
Patented Sept. 13, 1966

3,272,816
7-AMINO-2,4-DIOXO-1,2,3,4-TETRAHYDRO-PYRIDO[2,3-d]PYRIMIDINES
Viktor Papesch, Morton Grove, Ill., assignor to G. D. Searle & Co., Chicago, Ill., a corporation of Delaware
No Drawing. Filed Apr. 28, 1965, Ser. No. 451,656
5 Claims. (Cl. 260—256.4)

The present invention relates to a group of heteroaromatic amino-substituted bicyclic compounds. In particular, this invention relates to a group of compounds having the following general formula

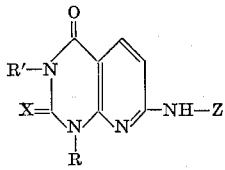

wherein R is selected from the group consisting of lower alkyl, lower alkenyl, hydroxy(lower alkyl), cyanoethoxyethyl, benzyl, or phenyl; R' is selected from the group consisting of hydrogen and lower alkyl; X is selected from the group consisting of O and S; and Z is selected from the group consisting of hydrogen and lower alkanoyl.

The lower alkyl radicals referred to above contain up to 6 carbon atoms and can be exemplified by radicals such as methyl, ethyl, propyl, butyl, pentyl, and hexyl. The lower alkenyl radicals referred to above likewise contain up to 6 carbon atoms and can be exemplified by radicals such as allyl and methallyl. In the hydroxy-(lower alkyl) radicals referred to above, there is also a limit of 6 in the number of carbons in the lower alkyl group. An example of this type of group is 2-hydroxyethyl. The lower alkanoyl groups referred to above contain up to 6 carbon atoms; examples of such groups are acetyl and propionyl.

The compounds of this invention are useful because of their pharmacological properties. Thus, they possess activity as anti-ulcer agents. In particular, the present compounds have been found to inhibit the formation of ulcers in the Shay rat.

The compounds of this invention are prepared by the dehydrogenation of the appropriate 1,2,3,4,5,6-hexahydropyrido[2,3-d]pyrimidine. A variety of dehydrogenating agents can be used for this purpose. Thus, for example, the reaction can be carried out using palladium on charcoal, rhodium on alumina, or dichlorodicyanoquinone.

To prepare those compounds in which Z in the formula above is alkanoyl, the appropriate corresponding amine is preferred as the starting material. Thus, a compound such as 7-amino-1,3-diethyl-2,4-dioxo-1,2,3,4-tetrahydropyrido[2,3-d]pyrimidine can be treated with an appropriate acylating agent such as acetyl chloride or acetic anhydride to give the amide.

The following examples are presented to further illustrate the present invention; they should not be construed as limiting it in spirit or in scope. In these examples, quantities are indicated in parts by weight and temperatures in degrees centigrade. When parts by volume are specified, the relationship between parts by weight and parts by volume is the same as that existing between grams and milliliters.

Example 1

A mixture of 8 parts of 7-amino-1,3-diethyl-2,4-dioxo-1,2,3,4,5,6-hexahydropyrido[2,3-d]pyrimidine, 870 parts of toluene, and 8 parts of palladium on charcoal are refluxed under nitrogen for 24 hours. The reaction mixture is filtered to remove the catalyst and the solvent is removed under reduced pressure to leave a crude residual solid. This product is recrystallized twice from benzene to give 7-amino-1,3-diethyl-2,4-dioxo-1,2,3,4-tetrahydropyrido[2,3-d]pyrimidine melting at about 204–206° C. This compound has the following formula

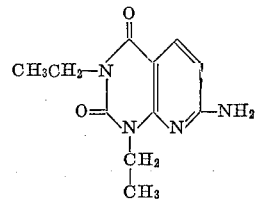

Example 2

1.4 parts of 7-amino-1,3-diethyl-2,4-dioxo-1,2,3,4,5,6-hexahydropyrido[2,3-d]pyrimidine is dissolved in 45 parts of tetrahydrofuran and hydrochloric acid is added to make the solution slightly acidic. Then, 10 parts of water is added to dissolve the hydrochloride salt which precipitates. 1.6 parts of 2,3-dicyano-5,6-dichloroquinone is added to the solution which is allowed to stand for 20 hours. Chloroform is added to the resultant solution which is then made alkaline by the addition of sodium hydroxide solution. The resultant mixture is then extracted with 3 portions of chloroform and the combined chloroform extracts are washed with 3 portions of sodium sulfite solution, then with water, and dried over anhydrous sodium sulfate. The chloroform solvent is evaporated and the residual solid is recrystallized from benzene to give 7-amino-1,3-diethyl-2,4-dioxo-1,2,3,4-tetrahydropyrido[2,3-d]pyrimidine melting at about 205–207° C.

Example 3

A mixture of 0.5 part of 7-amino-1,3-diethyl-2,4-dioxo-1,2,3,4,5,6-hexahydropyriod[2,3-d]pyrimidine, 88 parts of benzene, and 0.5 part of 5% rhodium on alumina catalyst is placed in a rocker bomb which is heated to 250° C. and maintained at that temperature for 15.5 hours. The bomb is allowed to cool before it is opened and the mixture is removed. This mixture is filtered to remove the catalyst and the benzene solvent is evaporated from the filtrate under reduced pressure. The resultant residue is recrystallized from 2-propanol to give 7-amino-1,3-diethyl-2,4-dioxo-1,2,3,4-tetrahydropyrido[2,3-d]pyrimidine melting at about 202–206° C.

Example 4

A mixture of 1.1 parts of 7-amino-1,3-diethyl-2,4-dioxo-1,2,3,4-tetrahydropyrido[2,3-d]pyrimidine and 6.5 parts of acetic anhydride is refluxed for 10 minutes. The resultant mixture is cooled and filtered and the solid thus separated is washed with methanol and then recrystallized from absolute ethanol to give 7-acetamido-1,3-diethyl-2,4-dioxo-1,2,3,4-tetrahydropyrido[2,3-d]pyrimidine melting at about 224–226.5° C. This comopund has the following formula

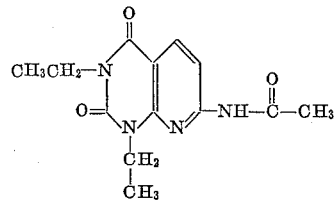

The corresponding propionyl derivative can be obtained by using propionic anhydride in place of the acetic anhydride in the above reaction.

Example 5

An equivalent quantity of 7-amino-1-ethyl-2,4-dioxo-1,2,3,4,5,6-hexahydropyrido[2,3-d]pyrimidine is substituted for the diethyl compound and the procedure described in Example 3 is repeated. The product thus obtained is 7 - amino - 1 - ethyl - 2,4 - dioxo - 1,2,3,4 - tetrahydropyrido[2,3-d]pyrimidine.

Example 6

An equivalent quantity of 7-amino-1-ethyl-3-methyl-2,4 - dioxo - 1,2,3,4,5,6 - hexahydropyrido[2,3-d]pyrimidine is substituted for the 7-amino-1,3-diethyl-2,4-dioxo-1,2,3,4,5,6 - hexahydropyrido[2,3-d]pyrimidine and the procedure described in Example 1 is repeated. In this case the product is 7-amino-1-ethyl-3-methyl-2,4-dioxo-1,2,3,4-tetrahydropropyrido[2,3-d]pyrimidine.

Example 7

1.9 parts of 1-allyl-7-amino-3-ethyl-2,4-dioxo-1,2,3,4,5,6-hexahydropyrido[2,3-d]pyrimidine is dissolved in 135 parts of tetrahydrofuran and hydrochloric acid is added until the mixture is slightly acidic. The hydrochloride salt of the starting material precipitates during this acidification and 50 parts of water is added to dissolve this salt. Then, 1.9 parts of 2,3-dicyano-5,6-dichloroquinone is added and the mixture is allowed to stand at room temperature for 44 hours. Sodium hydroxide solution is then added to give a slightly basic solution which is extracted with 3 portions of chloroform. The combined chloroform extracts are washed with 3 portions of sodium sulfite solution and then 3 times with water. The chloroform solution is then dried over sodium sulfate and the solvent is evaporated under reduced pressure. The resultant residue is recrystallized from benzene to give 1-allyl - 7 - amino - 3 - ethyl - 2,4 - dioxo - 1,2,3,4 - tetrahydropyrido[2,3-d]pyrimidine melting at about 187.5–188.5° C.

The required starting material is obtained in the following manner. 90 parts of 1-allyl-61amino-3-ethyluracil, 300 parts by volume of 50% by volume pyridine-water, 72 parts of acrylonitrile and 3 parts of 40% aqueous trimethylbenzylammonium hydroxide are heated to 80° C. on a steam bath. The reaction refluxes at this point and is kept at 85° C. for 12 minutes. The mixture is distilled under reduced pressure to remove volatile substances and a water-methanol solution is added to the residue to redissolve it. The resultant solution is again distilled under reduced pressure and the residual syrup is dissolved in 150 parts of hot ethyl acetate. The ethyl acetate solution is cooled and the precipitated solid is filtered and washed. This solid is then recrystallized twice from a mixture of water and methanol and then twice from water to give 1-allyl - 7 - amino - 3 - ethyl - 2,4 - dioxo - 1,2,3,4,5,6-hexahydropyrido[2,3-d]pyrimidine melting at about 252–253° C.

Example 8

A solution is prepared from 0.8 part of 7-amino-3-ethyl - 1 - (2 - hydroxyethyl) - 2,4 - dioxo - 1,2,3,4,5,6-hexahydropyrido[2,3-d]pyrimidine, 10 parts of water, and 25 parts of tetrahydrofuran. Hydrochloric acid is then added to give a slightly acidic solution. Then, 0.9 part of 2,3-dicyano-5,6-dichloroquinone is added and the mixture is allowed to stand for 65 hours. Chloroform is added followed by aqueous sodium hydroxide to give a slightly alkaline solution. The mixture is then extracted with 5 portions of chloroform and the combined chloroform extracts are extracted with 3 portions of sodium sulfite and then with 3 portions of water. The chloroform solution is then dried over sodium sulfate and the solvent is removed under reduced pressure. The residual solid is recrystallized from a mixture of benzene and 2-propanol to give 7-amino-3-ethyl-1-(2-hydroxyethyl)2,4-dioxo - 1,2,3,4 - tetrahydropyrido[2,3-d]pyrimidine melting at about 210.5–211.5° C.

Example 9

A solution is prepared from 4 parts of 7-amino-3-ethyl-1 - [2 - (2 - cyanoethoxy)ethyl] - 2,4, - dioxo-1,2,3,4,5,6-hexahydropyrido[2,3 - d]pyrimidine and 2,250 parts of warm tetrahydrofuran. Hydrochloric acid is added to give a slightly acidic solution and then 50 parts of water is added to dissolve the hydrochloride which precipitates. Finally, 4 parts of 2,3 - dicyano - 5,6 - dichloroquinone is added to the solution which is then allowed to stand for 18 hours. The solution is then made slightly alkaline with sodium hydroxide solution and the mixture is concentrated under reduced pressure. The resultant concentrated tetrahydrofuran solution is extracted with 3 portions of chloroform and the combined chloroform solutions are extracted first with 3 portions of sodium sulfite and then with 3 portions of water. The chloroform solution is then dried over anhydrous sodium sulfate and the solvent is evaporated under reduced pressure to leave an oily residue. This oily residue is dissolved in benzene and the benzene solution is filtered and cooled. The solid which precipitates is 7-amino-3-ethyl-1-[2-(2-cyanoethoxy)ethyl] - 2,4 - dioxo - 1,2,3,4 - tetrahydropyrido-[2,3-d]pyrimidine melting at about 133–134.5° C.

Example 10

A mixture of 19 parts of 7-amino-1,3-dimethyl-4-oxo-2 - thio - 1,2,3,4,5,6 - hexahydropyrido[2,3-d]pyrimidine and 820 parts of dimethylformamide is heated to dissolve the compound. The solution is cooled to room temperature and a solution of 12.5 parts of hydrochloric acid in 30 parts of 2-propanol is added followed by 20.9 parts of 2,3-dicyano-5,6-dichloroquinone. The resultant mixture is then allowed to stand for 18 hours. A considerable amount of crystalline solid precipitates during this time. This solid is separated by filtration and stirred with 250 parts of a 5% sodium sulfite solution. The resultant mixture is filtered and the precipitate is washed with water and then recrystallized from dimethylformamide to give 7-amino-1,3-dimethyl-4-oxo-2-thio-1,2,3,4-tetrahydropyrido[2,3-d]pyrimidine. This compound has the following formula

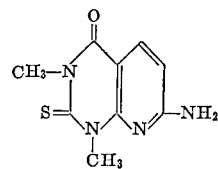

Example 11

A mixture of 2.5 parts of 7-amino-1,3-dimethyl-4-oxo-2 - thio - 1,2,3,4-tetrahydropyrido[2,3-d]pyrimidine and 105 parts of acetic anhydride is refluxed for 1 hour. The hot solution is filtered whereupon a precipitate forms in the filtrate. This filtrate is then cooled further and filtered and the solid is washed with absolute ether. The solid thus obtained is 7-acetamido-1,3-dimethyl-4-oxo-2-thio-1,2,3,4-tetrahydropyrido[2,3-d]pyrimidine melting at about 281–283° C.

Example 12

A solution of 140 parts of 6-amino-3-ethyl-1-(2-hydroxyethyl)uracil in 100 parts by volume of a 50% by volume pyridine-water mixture is heated on a steam bath to about 90° C. Then, 80 parts of acrylonitrile is added followed by 10 parts of 40% aqueous trimethylbenzylammonium hydroxide. An exothermic reaction ensues and the mixture boils for about 2 minutes. Volatile material is distilled from the mixture under reduced pressure and this operation is repeated twice—first after the addition of water and then after the addition of methanol. The residual syrup is dissolved in 800 parts of acetone and filtered after 90 minutes. The resultant precipitate is extracted with 60 parts of hot methanol and filtered while hot. The precipitate is then washed, first with acetone and then with ether, and it is recrystallized from methanol to give 7-amino-3-ethyl-1-[2-(2-cyanoethoxy)-ethyl] - 2,4 - dioxo - 1,2,3,4,5,6 - hexadydropyrido[2,3-d] pyrimidine melting at about 195–197° C.

The filtrate from the first acetone treatment above is evaporated to dryness and stirred in ethyl acetate. The mixture is filtered to remove some precipitate, it is allowed to stand for several days, and then filtered again to remove a new precipitate. The last solid is dissolved in a hot solution of 43% methanol in ethyl acetate and filtered hot to remove a small amount of insoluble material. The solution is then cooled. A new precipitate forms and is separated and dissolved in a mixture of 55% methanol and 45% ethyl acetate. The solution is chromatographed on a silica column to give 7-amino-3-ethyl - 1 - (2 - hydroxyethyl) - 2,4 - dioxo - 1,2,3,4,5,6-hexahydropyrido-[2,3-d]pyrimidine melting at about 215–217° C. after recrystallization from methanol.

What is claimed is:
1. A compound of the formula

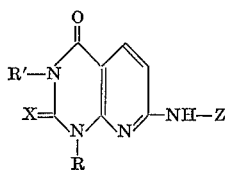

wherein R is selected from the group consisting of lower alkyl, lower alkenyl, hydroxyethyl, and cyanoethoxyethyl; R' is selected from the group consisting of hydrogen and lower alkyl; X is selected from the group consisting of O and S; and Z is selected from the group consisting of hydrogen and lower alkanoyl.

2. A compound of the formula

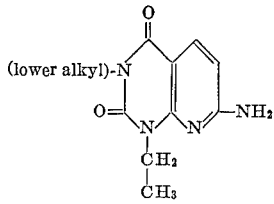

3. 7 - amino - 1,3 - diethyl - 2,4 - dioxo - 1,2,3,4-tetrahydropyrido[2,3-d]pyrimidine.

4. 7 - acetamido - 1,3 - diethyl - 2,4-dioxo - 1,2,3,4-tetrahydropyrido[2,3-d]pyrimidine.

5. 7 - amino - 1 - ethyl - 2,4 - dioxo - 1,2,3,4 - tetrahydropyrido[2,3-d]pyrimidine.

No references cited.

ALEX MAZEL, *Primary Examiner.*
MARY U. O'BRIEN, *Assistant Examiner.*